United States Patent
Clark

[15] 3,664,322
[45] May 23, 1972

[54] BARBECUE GRILL ASSEMBLY

[72] Inventor: Robert H. Clark, Freeport, Ill.

[73] Assignee: King-Seeley Thermos Co., Ann Arbor, Mich.

[22] Filed: Dec. 28, 1970

[21] Appl. No.: 101,455

[52] U.S. Cl. .......................................... 126/25 A
[51] Int. Cl. ........................................ F24b 3/00, A47j 37/00
[58] Field of Search ............................... 126/25 A, 25 R, 9 R

[56] References Cited

UNITED STATES PATENTS

| | | | |
|---|---|---|---|
| 2,314,791 | 3/1943 | Jones, Jr. et al. | 126/25 A |
| 3,051,159 | 8/1962 | Hardy | 126/25 A |
| 3,276,440 | 10/1966 | Sazegar | 126/25 A |
| 3,285,239 | 11/1966 | Drake | 126/25 A |
| 3,286,705 | 11/1966 | Bedol | 126/25 A |

*Primary Examiner*—Charles J. Myhre
*Attorney*—Harness, Dickey & Pierce

[57] ABSTRACT

A barbecue grill assembly comprising a bowl-like enclosure having a generally circular peripheral side wall and adapted to contain a bed of combustible fuel; an annular article support member disposed interiorly of the enclosure, means for vertically adjustably supporting the member within the enclosure including means on the inner periphery of the side wall of the enclosure defining a plurality of step-shaped support elements each having at least first and second vertically spaced and horizontally offset support surfaces, the elements being circumferentially spaced around and projecting inwardly from the side wall such that the first and second support surfaces lie in respective vertically spaced, horizontal planes, and means on the support member defining radially spaced first and second circumferentially staggered support portions adapted for engagement with selective of the support surfaces, whereby the support member may be rotated from a first vertical position wherein the first support portions thereof are circumferentially aligned with and adapted to bear upon the first support surfaces of the elements, to a second position vertically offset from the first position wherein the second support portions of the member are circumferentially aligned with and adapted to bear upon the second support surfaces of the elements.

12 Claims, 4 Drawing Figures

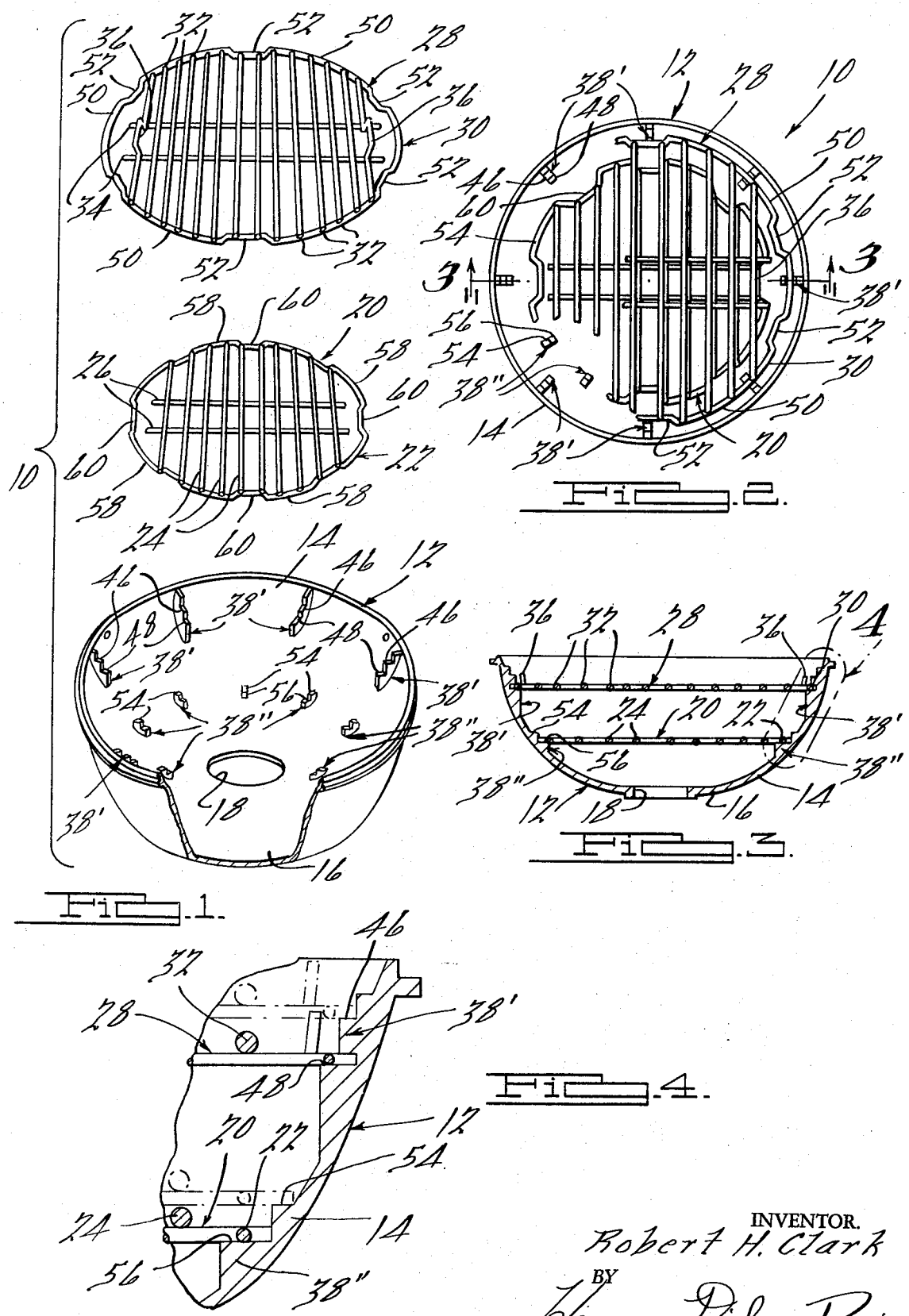

BARBECUE GRILL ASSEMBLY

SUMMARY OF THE INVENTION

Generally speaking, the present invention relates to a cooking unit commonly referred to as a barbecue grill and which typically utilizes a bed of burning fuel, such as charcoal or the like, for effecting the heating and/or cooking of food. More particularly, the present invention is directed toward a novel barbecue grill assembly that utilizes a simple and highly effective means for adjustably mounting both the food supporting grill and fuel supporting grate thereof at different vertically spaced positions relative to one another and relative to the associated grill housing, thus permitting adjustment of the desired cooking time (or speed), as well as optimizing cooking efficiency in accordance with flame heat, characteristics of a particular fuel, etc. Additionally, food can be cooked primarily at one preselected vertically disposed position with respect to the associated fire bed, and then raised to a different (higher) vertically spaced position to be merely kept hot for a prolonged period of time. Thus, and as will hereinafter be described in detail, the present invention provides a novel barbecue grill assembly which is adapted to minimize cooking time and effort, and permits the operator to achieve maximum efficiency of the heating or cooking fuel utilized therein.

It is accordingly a general object of the present invention to provide a new and improved barbecue grill assembly.

It is a more particular object of the present invention to provide a barbecue grill which features a new and improved means for selectively vertically adjusting the food supporting grill and fire bed supporting grate members thereof.

It is yet a more particular object of the present invention to provide a barbecue grill assembly of the above described character wherein the means for vertically adjusting the grill and grate members consist of a plurality of circumferentially spaced stepped-shaped support elements extending inwardly from the assembly housing, the support elements being cooperable with circumferentially staggered edge portions of the grill and grate members which are adapted for engagement with stepped support surfaces on the elements.

It is a further object of the present invention to provide a new and improved barbecue grill assembly of the above described character which is of relatively simple design, is economical to manufacture and easy to assemble.

Other objects and advantages of the present invention will become apparent from the following detailed description taken in conjunction with the accompanying drawing.

BRIEF DESCRIPTION OF THE DRAWING

FIG. 1 is an exploded assembly view of the barbecue grill assembly embodying the principles of the present invention;

FIG. 2 is a top elevational view of the grill assembly illustrated in FIG. 1;

FIG. 3 is a transverse cross-sectional view taken substantially along the line 3—3 of FIG. 2; and FIG. 4 is an enlarged fragmentary cross-sectional view of the structure illustrated within the oval 4 of FIG. 3.

DETAILED DESCRIPTION OF THE PREFERRED EMBODIMENT

Referring now in detail to the drawing and in particular to FIG. 1 thereof, a barbecue grill assembly 10, in accordance with an exemplary embodiment of the present invention, is shown generally as comprising a bowl-like enclosure or housing 12 which is open at the upper end or top thereof and includes a downwardly and inwardly inclined circular side wall section 14 which terminates at the lower end thereof in a generally horizontally disposed bottom section 16 that is formed with a central vent or draft aperture 18. The enclosure 12 is preferably fabricated of a molded or cast metal material, such as cast aluminum or some other suitable material which particularly lends itself to the present invention, as will hereinafter be described in detail.

The enclosure 12 is adapted to operatively contain a bed of combustible fuel, such as charcoal or the like (not shown) which is adapted to be supported upon a generally circular shaped grate 20 operatively mounted within the enclosure 12 at a position generally shown in FIG. 3. The grate 20 comprises an annular rim member 22 and a plurality of spaced parallel members 24 which are secured at the opposite ends thereof, as by welding or the like, to the member 22. A pair of spaced parallel reinforcing members, generally designated 26, are secured to and extend generally perpendicularly of the members 24, as best seen in FIG. 1. The members 22, 24 and 26 are preferably fabricated of a heavy gauge wire or rod stock, which may be suitably plated, galvanized or the like, as is well known in the art.

The grate 20 is adapted to be operatively associated with a food supporting grill, generally designated by the numeral 28, which is disposed directly above the grate 20 and functions to operatively support food or the like which is to be cooked, heated, etc. by means of the combustible fuel supported upon the grate 20. The grill 28, as best seen in FIG. 1, comprises a generally circular shaped rim member 30 and a plurality of spaced parallel members 32 which are secured at their opposite ends to the member 30. A pair of reinforcing members 34 are secured to and extend generally perpendicularly of the members 32, also as seen in FIG. 1. The members 30, 32 and 34 are preferably fabricated of a heavy gauge wire or rod stock, and the laterally opposite or outermost of the members 32 may have upwardly offset handle portions 36 formed therein to facilitate manipulation of the grill 28 during a grilling operation and to facilitate placing the grill 28 within the enclosure 12 preparatory to such operation and removing the same thereafter, as is well known in the art.

In accordance with the principles of the present invention, the barbecue grill assembly 10 is provided with a new and improved means for selectively vertically adjusting or positioning the grate 20 and grill 28 within the enclosure 12, whereby to provide for careful control of the heat applied to the food supported upon the grill 28. More particularly, the enclosure 12 is provided with a plurality of support elements, generally designated by the numeral 38, which are preferably, but not necessarily, formed integrally of the inner surface of the side wall section 14 thereof and project radially inwardly so as to be adapted for operative engagement with the rim members 22 and 30 of the grate 20 and grill 28, respectively. The plurality of support elements 38 are arranged in two vertically spaced series or sets, namely an upper series of support elements 38' and a lower series of support elements 38", which extend circumferentially around the interior of the side wall section 14 of the enclosure 12. As will be apparent, the upper series of support elements 38' is adapted to operatively support the grill 28, while the lower series of elements 38" is adapted to operatively support the grate 20 at a position spaced vertically downwardly or below the grill 28, as best seen in FIG. 3. By virtue of the fact that the plurality of support elements 38" are virtually identical in construction and operation to the series of support elements 38', the following detailed description of said elements 38' will be applicable to the elements 38".

As best seen in FIGS. 1 and 3, the plurality of support elements 38' are equally circumferentially spaced around the inner surface of the side wall section 14 of the enclosure 12 and extend radially inwardly therefrom. Each of the elements 38' is formed with generally horizontally projecting upper face portion or surface 46, all of which surfaces 46 lie in a common horizontal plane. Additionally, each of the elements 38' is formed with a lower horizontal face or surface 48, with all of the surfaces 48 lying in a common horizontal plane spaced vertically below the plane in which the surfaces 46 lie. It will be seen that each of the surfaces 48 is located radially inwardly from the associated of the surfaces 46, with the result that the elements 38' are of a generally stepped shaped configuration.

With reference to the grill 28, it will be seen that the rim member 30 thereof is formed with circumferentially staggered radially offset sections 50 and 52, with the sections 50 being spaced radially outwardly from the sections 52, as best seen in FIGS. 1 and 2. The rim member 30 is formed with an equal number of radially offset sections 50 and 52, with the number of said sections 50 and 52 also being equal to the number of support elements 38'. The rim member 30 is designed such that all of the sections 50 thereof lie around the circumference of an imaginary circle having a diameter equal to the diameter of an imaginary circle whose circumference extends through the plurality of upper surfaces 46. Similarly, all of the sections 52 of the rim member 30 lie along the circumference of an imaginary circle whose diameter is equal to the diameter of a circle whose circumference extends through the plurality of lower support surfaces 48 of the support elements 38'.

At such time as it is desired to operatively mount the grill 28 upon the plurality of elements 38', the grill 28 is moved into registry with the open upper end of the enclosure 12 and is then rotated, for example, to a position wherein the sections 50 of the rim member 30 are circumferentially aligned with the plurality of support elements 38. Thereafter, the grill 28 may be lowered to a position wherein the plurality of sections 50 of the rim member 30 will bear upon and be supported by the upper support surfaces 46. When it is desired to lower the grill 28 within the enclosure 12, the grill 28 is merely rotated slightly to a position wherein the plurality of sections 52 of the rim member 30 are circumferentially aligned with the support elements 38', at which time the grill 28 may be lowered to a position wherein said sections 52 of the rim member 30 bear upon and are supported by the support surface 48, as will be apparent to those skilled in the art. Similarly, when it is desired to raise the grill 28, for example, from the solid line position shown in FIG. 4 to the phantom position shown in this figure, the grill 28 is lifted upwardly and then rotated to a position wherein the sections 50 of the rim member 30 are again in registry with the support elements 38' so that the grill 28 may again be supported upon the upper support surface 46.

The plurality of support elements 38'', as previously mentioned, are similar in construction and operation to the elements 38', with the exception that the elements 38'', by virtue of the downwardly and inwardly inclined configuration of the side wall section 14, are spaced downwardly and radially inwardly from the elements 38'. The elements 38'' are formed with upper and lower horizontal support surfaces 54 and 56, the latter of which are spaced below and radially inwardly with respect to the associated of the upper surfaces 54, with the result that the elements 38'' are also of a generally stepped shaped configuration. It may be noted that the plurality of elements 38 are preferably circumferentially staggered with respect to the upper series of elements 38'.

The support surfaces 54, 56 are adapted for operative association with radially offset, circumferentially staggered, rim sections 58 and 60 of the rim member 22 of the grate 20, whereby the grate 20 is adapted to be moved between the two vertically spaced locations shown in solid and phantom lines in FIG. 4 upon proper rotational movement of the grate 20 so that the rim sections 58 or 60 thereof are properly circumferentially aligned with the elements 38'', as above described.

It will be appreciated, of course, that while the support elements 38 are preferably formed integrally of the side wall section 14 of the enclosure 12, said elements may consist of separate support members which are attached to the inner surface of the side wall section 14, as by suitable screws, bolts or the like. Additionally, it will be apparent that while the elements 38 have been illustrated herein as providing for two vertically spaced adjusted positions, said elements 38 could provide for more adjusted positions by providing a greater number of vertically offset support surfaces on the elements 38 and providing a greater number of radially offset sections on the associated of the grill and/or grate rim members. Of course, such constructions come within the scope of the present invention. It will be seen from the foregoing, that the present invention provides an extremely simple, yet effective means for enabling vertical adjustment of both the grate 20 and grill 28, without any appreciable increase in the difficulty or cost of manufacture of the assembly 10, and without in any way detracting from the aesthetic appearance thereof.

While it will be apparent that the preferred embodiment illustrated herein is well calculated to fulfill the objects above stated, it will be appreciated that the present invention is susceptible to modification, variation and change without departing from the scope of the invention.

I claim:

1. In combination in a barbecue grill assembly,
   a bowl-like enclosure having a generally circular peripheral side wall and adapted to contain a bed of combustible fuel,
   an annular article support member disposed interiorly of said enclosure,
   means for vertically adjustably supporting said member within said enclosure including means on the inner periphery of said side wall of said enclosure defining a plurality of step-shaped support elements each having at least first and second vertically spaced and horizontally offset support surfaces,
   said elements being circumferentially spaced around and projecting inwardly from said side wall such that said first and second support surfaces lie in respective vertically spaced, horizontal planes, and
   means on said support member defining first and second circumferentially staggered support portions adapted for engagement with selective of said support surfaces, whereby said support member may be vertically adjusted within said enclosure by being rotated from a first position wherein said first support portion thereof is circumferentially aligned with and adapted to bear upon said first support surfaces of said elements, to a second position wherein said second support portion thereof is circumferentially aligned with and adapted to bear upon said second support surfaces of said elements.

2. The invention as set forth in claim 1 wherein said support elements are integral of said side wall of said enclosure.

3. The invention as set forth in claim 1 wherein said means defining said support portions on said support member comprises an annular rim member having circumferentially staggered radially offset sections.

4. The invention as set forth in claim 1 wherein said enclosure is fabricated of a cast metal material.

5. The invention as set forth in claim 1 wherein said side wall of said enclosure is inclined radially inwardly and downwardly.

6. In combination in a barbecue grill assembly,
   a bowl-like enclosure having a generally circular shaped downwardly and inwardly inclined side wall section and adapted to contain a bed of combustible fuel therein,
   an annular grate support member disposed interiorly of said enclosure for supporting said bed of fuel therein,
   an annular grill adapted to support food and the like interiorly of said enclosure and at a position above said bed of fuel,
   means for vertically adjustably supporting said grill and said grate within said enclosure including means on the inner periphery of said side wall section defining first and second vertically spaced sets of step-shaped support elements each having at least first and second vertically spaced and horizontally offset support surfaces,
   said first set of support elements adapted to support said grate and said second set of support elements adapted to support said grill,
   said elements being circumferentially spaced around and projecting inwardly from said side wall section such that said first and second support surfaces of each of said sets of elements lie in respective vertically spaced horizontal planes, means on said grate and said grill defining first and second circumferentially staggered sections adapted for engagement with said support surfaces of the associated of said sets of support elements, whereby said grate and said grill may be rotated from first vertical positions wherein said first support sections thereof are circumferentially aligned with and adapted to bear upon said first support surfaces of the associated of said sets of elements, to second positions vertically offset from the associated of said first positions wherein said second support sections thereof are circumferentially aligned with and adapted to bear upon said second support surfaces of the associated of said sets of said elements.

7. The invention as set forth in claim 6 wherein said support elements are integral of said side wall of said enclosure.

8. The invention as set forth in claim 6 wherein said means defining said support sections on said grill and said grate comprises annular rim members having circumferentially staggered radially offset sections.

9. The invention as set forth in claim 6 wherein said enclosure is fabricated of a cast metal material.

10. The invention as set forth in claim 6 wherein said support elements are integral of said side wall section of said enclosure and wherein said enclosure is fabricated of a cast metal material.

11. The invention as set forth in claim 10 wherein said sets of elements are circumferentially offset from one another.

12. The invention as set forth in claim 11 wherein the lowermost of said support elements are spaced radially inwardly from the uppermost set thereof.

* * * * *